US008898789B2

(12) United States Patent
Shanley

(10) Patent No.: US 8,898,789 B2
(45) Date of Patent: Nov. 25, 2014

(54) DETECTING MALICIOUS SOFTWARE ON A COMPUTING DEVICE WITH A MOBILE DEVICE

(75) Inventor: Robert J. Shanley, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 226 days.

(21) Appl. No.: 13/160,165

(22) Filed: Jun. 14, 2011

(65) Prior Publication Data

US 2012/0324577 A1  Dec. 20, 2012

(51) Int. Cl.
*G06F 21/00*  (2013.01)
*G06F 21/56*  (2013.01)

(52) U.S. Cl.
CPC ............ *G06F 21/567* (2013.01); *G06F 21/564* (2013.01)
USPC .................................. 726/24; 726/22; 726/25

(58) Field of Classification Search
CPC .... G06F 21/562; G06F 21/564; G06F 21/567
See application file for complete search history.

(56) References Cited

U.S. PATENT DOCUMENTS

| | | | | |
|---|---|---|---|---|
| 7,591,018 | B1 * | 9/2009 | Lee | 726/24 |
| 7,802,300 | B1 * | 9/2010 | Liu et al. | 726/23 |
| 2001/0005889 | A1 * | 6/2001 | Albrecht | 713/201 |
| 2003/0120947 | A1 * | 6/2003 | Moore et al. | 713/200 |
| 2003/0162575 | A1 * | 8/2003 | Morota et al. | 455/575 |
| 2004/0158741 | A1 * | 8/2004 | Schneider | 713/201 |
| 2007/0078915 | A1 * | 4/2007 | Gassoway | 707/205 |
| 2007/0261118 | A1 * | 11/2007 | Lu | 726/24 |
| 2008/0282351 | A1 * | 11/2008 | Khilnani et al. | 726/24 |
| 2009/0293126 | A1 * | 11/2009 | Archer et al. | 726/24 |
| 2010/0011443 | A1 * | 1/2010 | Zhao | 726/24 |
| 2010/0154062 | A1 * | 6/2010 | Baram et al. | 726/24 |
| 2010/0241875 | A1 * | 9/2010 | Ishii et al. | 726/24 |

FOREIGN PATENT DOCUMENTS

DE  WO2005109302  * 11/2005

OTHER PUBLICATIONS

"Universal Serial Bus Usage Tables for HID Power Devices," USB Implementers Forums, Release 1.0, Nov. 1, 1997, 66 pages.*
Rudzuka, et al. "Rootkit Detection Experiment within a Virtual Environment," Electronics and Electrical Engineering, ISSN 1392-1215, No. 8(104), pp. 63-68, 2010.*

* cited by examiner

*Primary Examiner* — Kaveh Abrishamkar
*Assistant Examiner* — Robert Leung
(74) *Attorney, Agent, or Firm* — Brooks, Cameron & Huebsch, PLLC

(57) ABSTRACT

Systems, methods, devices, and machine readable media for detecting malicious software on a computing device with a mobile device are provided. One method includes causing a mobile device to mount a non-volatile memory of the computing device, scanning the non-volatile memory of the computing device with the mobile device using a low-level read operations scan, collecting data on the mobile device from the low-level read operations scan, and evaluating the data collected on the mobile device for malicious software on the computing device.

20 Claims, 2 Drawing Sheets

DETECTING MALICIOUS SOFTWARE ON A COMPUTING DEVICE WITH A MOBILE DEVICE

TECHNICAL FIELD

The present disclosure relates to detecting malicious software on a computing device with a mobile device.

BACKGROUND

During recent years, attacks on computers and computer networks by malicious software has increased as has the dependence of individuals, companies, and government agencies on their computers and computer networks. Malicious software (e.g., rootkits, viruses, worms) can include software designed to perform unwanted actions (e.g., damage computers, disrupt operation, gain information, gain unauthorized access to system resources).

Antivirus software programs can be used to detect, prevent, and/or remove malicious software. Prior solutions using antivirus software programs include running an antivirus program on a computing device (e.g., desktop computer). When running an antivirus software program on a computing device, the program makes requests to an operating system of the computing device to scan (e.g., read) a number of files to determine whether the files are infected with malicious software. However, in some instances, malicious software (e.g., rootkits) can intercept these requests and modify the resulting action, for example, by returning an uninfected version of the file to the antivirus software program or hiding an infected file entirely. Therefore, in some instances, data coming from an infected operating system cannot be trusted.

Some antivirus programs enabled a computing device to boot to a CD, Universal Serial Bus (USB), and/or a separate partition that runs an antivirus software program that scans the computing device for malicious software. However, in such instances the operating system of the computing device can be unavailable to a user because the computing device has been booted to the CD, USB, and/or separate partition.

Malicious software detection and/or removal programs can also use system resources when running. As a result, computer performance can be degraded when the malicious software detection and/or removal programs are used. One remedy has been to schedule the programs to run during hours when the computer is not in use, for example, during the night. This, however, merely avoids the problem of degraded computer performance and does not provide a resolution for the actual problem of degraded performance.

DETAILED DESCRIPTION

Figure 1:
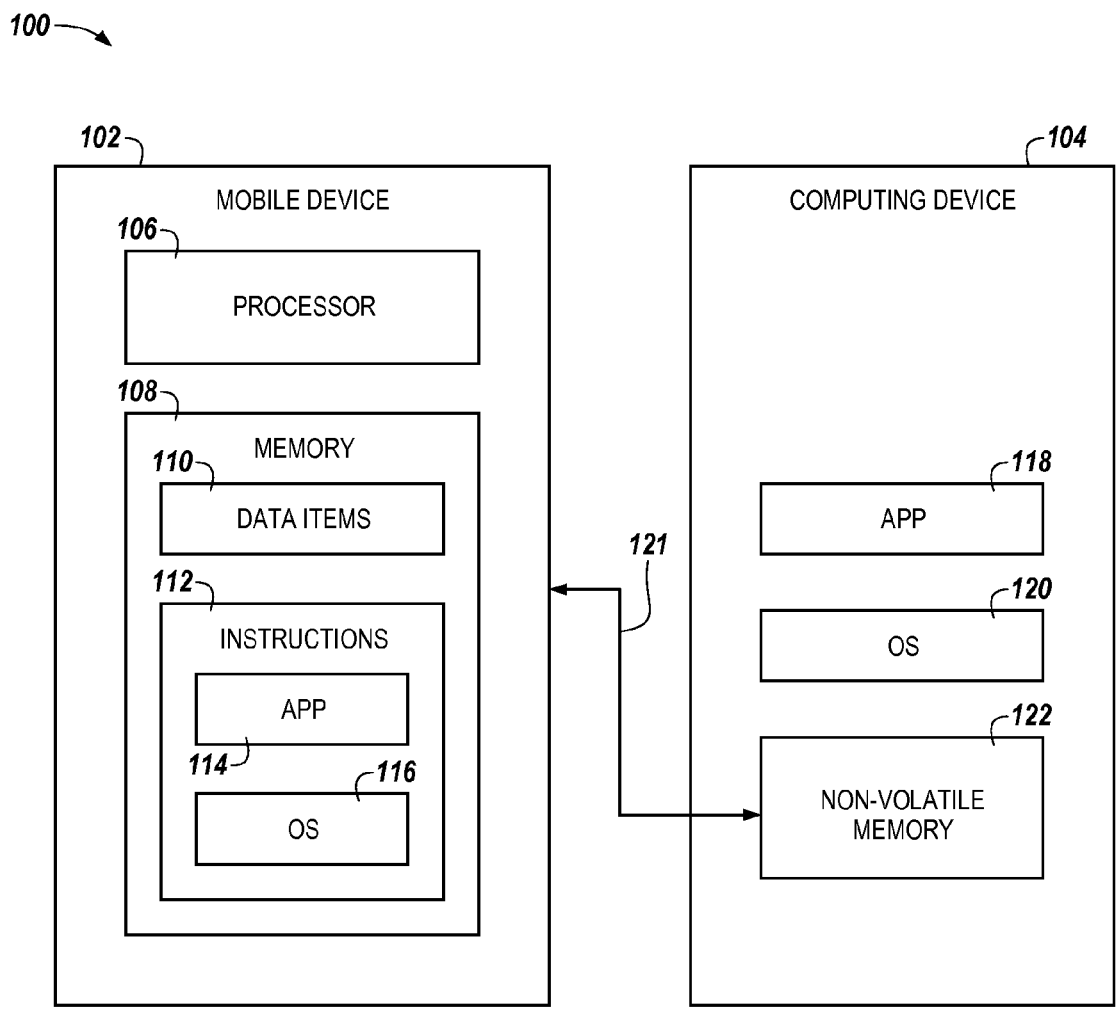
FIG. 1 illustrates a system for detecting malicious software on a computing device with a mobile device according to one or more embodiments of the present disclosure.

The present disclosure provides systems, methods, devices, and machine readable media for detecting malicious software on a computing device with a mobile device. One or more embodiments include causing the mobile device to mount a non-volatile memory of the computing device, scanning the non-volatile memory of the computing device with the mobile device using a low-level read operations scan, collecting data on the mobile device from the low-level read operations scan, and evaluating the data collected on the mobile device for malicious software on the computing device.

Embodiments of the present disclosure can reduce the system resources that are utilized from a user's computing device to run antivirus software programs. As an example, embodiments can provide a mobile device that mounts the non-volatile memory of the computing device and scans the non-volatile memory of the computing device using a low-level read operations scan and/or an operating system-level scan. By performing the low-level read operations scan and/or an operating system-level scan on the mobile device, processing load is shifted off of the computing device onto the mobile device. This can free system resources (e.g., memory resources, processor resources) on the computing device, thus providing the similar or better scanning ability as prior solutions while using minimal system resources of the computing device.

Various embodiments of the present disclosure can increase the chances of detecting malicious software (e.g., rootkit, virus, trojan horse, worm, spyware, adware, scareware, crimeware) on a computing device by causing the mobile device to mount the non-volatile memory of the computing device and scanning the non-volatile memory of the computing device using a low-level read operations scan and/or an operating system-level scan. By causing the mobile device to mount the non-volatile memory of the computing device and scanning the non-volatile memory of the computing device using a low-level read operations scan, the present disclosure can bypass the operating system and consequently, the mobile device can scan the computing device without interference from the malicious software; all while still providing the user access to the computing device.

In the following detailed description of the present disclosure, reference is made to the accompanying drawings that form a part hereof, and in which is shown by way of illustration how one or more embodiments of the disclosure may be practiced.

These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

As used herein, "a" or "a number of" something can refer to one or more such things. For example, "a number of differences" can refer to one or more differences.

FIG. 1 illustrates a system 100 for detecting malicious software on a computing device 104 with a mobile device 102 according to one or more embodiments of the present disclosure. In the embodiment illustrated in FIG. 1, the system 100 is provided for detecting malicious software on a computing device 104 with a mobile device 102. Mobile device 102 can be, for example, a mobile device (e.g., cellular phone, smart phone, personal digital assistant (PDA), handheld computing device, etc.). Computing device 104 can be, for example, a personal and/or business computer (e.g., laptop, desktop) among other types of computing devices.

Mobile device 102 can, for example, include a processor 106 and a memory 108. Mobile device 102 can include a display, a wireless receiver, and/or a wireless transceiver, among other components. Memory 108 can include data items 110 and machine-executable instructions 112. Machine-executable instructions 112 can include a number of applications 114 (e.g., software objects and/or program modules, among others) including an operating system 116. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The processor 106 executes instructions and can, in some devices, be utilized to control the operation of the entire device. The processor 106 can include a control unit that organizes data and program storage in memory and transfers data and/or other information between the various parts of the device 102. Although the mobile device is shown to contain only a single processor 106, the disclosed embodiment also applies to devices that may have multiple processors with some or all performing different functions and/or in different ways.

The memory 108 includes data items 110 and instructions 112 capable of being executed by the processor 106 to carry out the functions as described herein. In another embodiment, some or all of the functions are carried out via hardware in lieu of a processor-based system.

Memory 108 can be volatile or non-volatile memory. Memory 108 can also be removable (e.g., portable) memory, or non-removable (e.g., internal) memory. For example, memory 108 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 108 is illustrated as being located in mobile device 102, embodiments of the present disclosure are not so limited. For example, memory 108 can also be located internal to another computing resource, e.g., enabling the computer readable instructions to be downloaded over the Internet or another wired and/or wireless connection.

In some embodiments, mobile device 102 can have a display, which is that part of the device 102 that displays information to a user of device 102. The display may be for example, a liquid crystal display (LCD). In some embodiments, the display may be a gas or plasma-based flat-panel display or a traditional cathode-ray tube (CRT) display. In some embodiments, any appropriate display device may be used. Further, mobile device 102 can include any number of displays.

Mobile device 102 can have a wireless transceiver that can be configured to send and/or receive wireless communication over any suitable communications network through any suitable communications protocol. In some embodiments of the present disclosure, the wireless transceiver can send and receive long range RF signals such as cellular telephone signals. In other embodiments, the RF transceiver can include a Bluetooth transceiver, a 802.XX transmitter such as a Worldwide Interoperability for Microwave Access (WiMAX) transceiver or a WiFi transceiver, or an active or passive radio-frequency identification (RFID) tag. Other suitable transceivers may include, but are not limited to, any transceiver that has wireless capabilities and small form factor.

The computing device 104 illustrated in FIG. 1 can, for example, include applications 118, including an operating system 120, and/or a non-volatile memory 122, although the computing device 104 can include the same features as the mobile device 102 and/or other features, as discussed herein.

In various embodiments, mobile device 102 can mount the non-volatile memory 122 of the computing device 104 and can scan the non-volatile memory 122 of the computing device using a low-level read operations scan and an operating system-level scan. In some embodiments, mobile device 102 can scan both volatile and non-volatile 122 memory of the computing device 104 for malicious software. When the mobile device 102 mounts the non-volatile memory 122 of the computing device 104, the mobile device 102 can also be configured to accept an electrical charge from the computing device 104 to charge a number of batteries located in mobile device 102 in a wired and/or wireless manner.

Mobile device 102 can mount the non-volatile memory 122 of computing device 104 via a communication path 121. Examples of communication path 121 can include an electronic bus, such as, Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. Communication path 121 can also be achieved wirelessly in some embodiments.

As used herein, a low-level read operations scan is defined as an operation performed by a program for detecting malicious software on the computing device 104 that searches for and reads data directly from the non-volatile memory at a hardware level, thus bypassing the operating system. For example, a low-level read operations scan can read binaries present on the non-volatile memory.

In an example, the low-level read operations scan can be performed at a level lower than a kernel level to detect malicious software. Alternatively, and/or in addition, the low-level read operations scan can be performed at the kernel level to detect malicious software. As discussed herein, malicious software (e.g., rootkits) can be located at and/or below the kernel level. By performing the low-level read operations scan, the areas where the malicious software is located can be scanned.

The kernel level is defined as a layer of the operating system that contains the kernels of the operating system. Kernels are modules of the operating system that can be responsible for memory management, process management, and task management, and/or disk management.

An operating system-level scan is defined as an operation performed by a program for detecting malicious software (e.g., McAfee® Total Protection, Symantec™ Norton™ AntiVirus) on the computing device 104 that searches for and reads data by making requests through the operating system. Instead of reading binaries directly from the non-volatile memory hardware, file reads can be performed using the operating system application programming interface (API). If the operating system is infected with malicious software, the data returned from the API may differ from the data on the physical device.

If malicious software is present, however, the software may pass altered copies of the binaries that appear to be uninfected with the malicious software to the program and/or may hide infected binaries from the program. As a result of the altered or hidden copies of the binaries, the program for detecting malicious software may not be able to detect malicious software in some instances.

In some embodiments, scanning data from the low-level read operations scan and the operating system-level scan can be collected by the mobile device 102 and optionally stored in memory 108 temporarily and/or permanently. Mobile device 102 can analyze the scanning data from the low-level read operations scan and the operating system-level scan for differences.

In an example, this can include analyzing a number of binaries present on the non-volatile memory (e.g., low-level read operations scan) and a number of copies of binaries within an operating memory (e.g., operating system-level scan) for differences. In an example, a difference can exist when binaries present on the non-volatile memory are not identical to their respective copies within the operating system.

By bypassing the operating system with a low-level read operations scan and reading data (e.g., a number of binaries) directly off of the non-volatile memory 122, data retrieved by the low-level read operations scan is not altered by the malicious software so as to appear uninfected because the scan is of a level lower (e.g., hardware level) than where the malicious software is located (e.g., kernel level). As a result, if differences between the low-level read operations scan and the operating system-level scan are identified, this can be an indication that malicious software has altered copies of the binaries that are read in the operating scan and that malicious software is present on the computing device 104. Accordingly, mobile device 102 can generate an indication of a presence of malicious software on the computing device 104 and/or take corrective actions to eliminate the malicious software.

Figure 2:
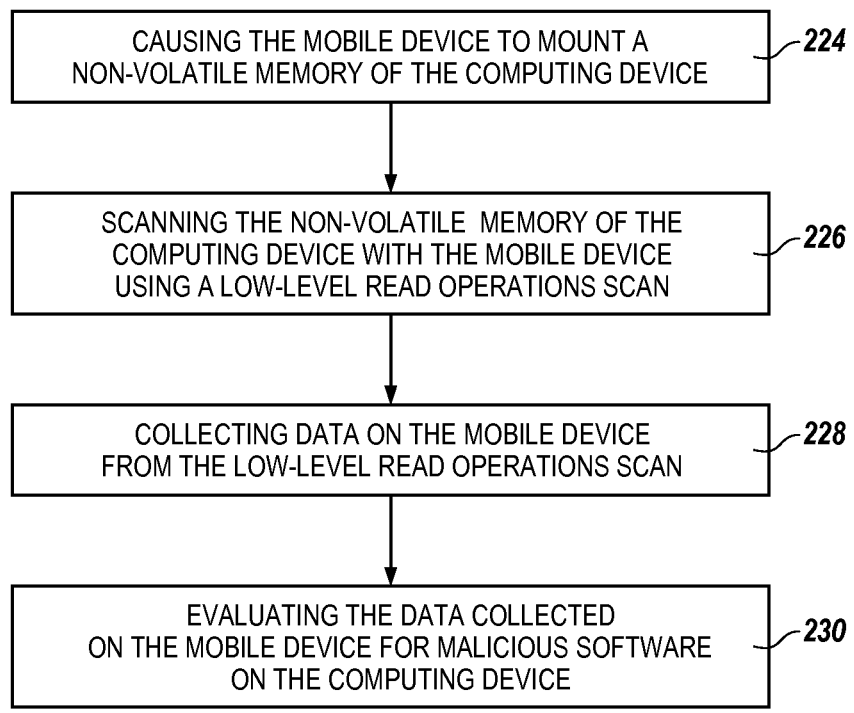
FIG. 2 illustrates a method for detecting malicious software on a computing device with a mobile device according to one or more embodiments of the present disclosure.

FIG. 2 illustrates a block diagram illustrating an example of a method for detecting malicious software on a computing device with a mobile device. The method includes causing the mobile device to mount a non-volatile memory of the computing device at block 224. The method, at block 226, includes scanning the non-volatile memory of the computing device with the mobile device using a low-level read operations scan.

At block 228, the method includes collecting data on the mobile device from the low-level read operations scan. In some embodiments, collecting scanning data on the mobile device includes collecting data from an operating system-level scan performed by the mobile device for detecting malicious software on the computing device. In various embodiments, the operating system-level scan can be performed with an on-line malicious software scanning service (e.g., Trend Micro™ HouseCall, BitDefender® Online Scanner) and/or by a program for detecting malicious software executed on the computing device. In such an embodiment, results and/or data associated with the results of the on-line malicious software scanning service and/or program for detecting malicious software can be provided to the mobile device for use in detecting malicious software on the computing device.

At block 230, the method includes evaluating the data collected on the mobile device for malicious software. In some embodiments, evaluating the data from the scan can include comparing the data collected from the low-level read operations scan performed with the mobile device with the data collected from the operating system-level scan performed with the mobile device, the on-line malicious software scanning service, and/or the program for detecting malicious software on the computing device.

As discussed herein, by using a low-level read operations scan, the mobile device can read data directly off of the non-volatile memory of the computing device. In prior approaches, antivirus programs were located on a user's computing device and performed operating system-level scans. The operating system of the user's computing device could take requests from the antivirus program to detect and/or retrieve data (e.g., binary code) from the hardware (e.g., non-volatile memory).

In the present disclosure, the mobile device can be configured with an application that can read the binary code on the hardware of the computing device and evaluate it for malicious software. By configuring the mobile device in such a way, a scan of the computing device's hardware can be performed without involving the operating system of the computing device and any associated alterations of data made by the malicious software.

Scanning data from the low-level read operations scan can, in some embodiments, be collected by the mobile device and optionally stored in memory temporarily and/or permanently. The mobile device can evaluate the scanning data from the low-level read operations by, for example, using a signature based detection method for detecting malicious software. A signature can be defined as a unique section of code that can be used by an antivirus program as an identifying marker for malicious software. A signature can be defined by analyzing malicious software and determining an appropriate section of code to use as the malicious software's signature. A number of malicious software signatures can then be compiled into a list for use by the mobile device. The mobile device can then scan the computing device for malicious software matching a signature provided on the list. Files that include a signature that is provided on the list can then be flagged as potentially malicious software and/or corrective actions can be taken by the mobile device (e.g., quarantining the potentially malicious software and/or deleting the potentially malicious software). In some embodiments, this information can be provided to antivirus software located on the computing device and/or at other locations and/or to antivirus software developers for use in improving their detection of malicious programs.

In some embodiments, the mobile device can evaluate the scanning data from the low-level read operations scan using a heuristic detection method for detecting malicious software. In an example, the mobile device can perform heuristic detection by using file emulation. File emulation can be performed by, for example, executing an instruction of the potentially malicious software within a virtual machine. A simulation of what would happen if the potentially malicious software were executed in the computing device can then be performed while the software is within the virtual machine.

The virtual machine can be defined as a software implementation of a physical machine (e.g., computing device) that executes programs like a physical machine. Because the virtual machine can be a software implementation of the computing device, execution of the potentially malicious software can be observed within the virtual machine without affecting the computing device. Upon execution of the potentially malicious software, the mobile device can analyze the software to determine if activities associated with the malicious software (e.g., file overwrites and/or deletes, replication of the malicious software, and/or attempts to hide a presence of the malicious software) are present.

Alternatively, and/or in addition, the mobile device can perform an operating system-level scan of the computing device. In an example, a program for detecting malicious software can be loaded onto the mobile device and can perform the operating scan of the computing device. In such an embodiment, processor resources of the computing device can be freed because the processing load associated with running the program for detecting malicious software can be shifted to the mobile device.

Examples of the present disclosure can include a machine-readable non-transitory medium storing instructions for detecting malicious software on a computing device with a mobile device. The medium can recognize a non-volatile memory of the computing device that is mounted by the mobile device. The medium can scan the non-volatile memory using a low-level read operations scan. The medium can collect scanning data on the mobile device from the low-level read operations scan and an operating system-level scan.

The medium can evaluate the scanning data from the low-level read operations scan and the operating system-level scan, wherein the data from the low-level read operations scan and the operating system-level scan are compared. The medium can indicate the existence of malicious software when a number of differences between the low-level read operations scan and the operating system-level scan are detected.

Examples of the present disclosure can include a mobile device for detecting malicious software on a computing device. The mobile device can recognize a non-volatile memory of the computing device that is mounted by the mobile device.

The mobile device can scan the non-volatile memory using a low-level read operations scan and, in some embodiments, an operating system-level scan. The mobile device can collect scanning data on the mobile device from the low-level read operations scan and, in some embodiments, the operating system-level scan. In some such embodiments, the mobile device can evaluate differences between the low-level read operations scan and the operating system-level scan. The mobile device can indicate the existence of malicious software when a number of differences between the low-level read operations scan and the operating system-level scan are detected.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for detecting malicious software on a computing device with a mobile device, comprising:
   causing the mobile device to mount a non-volatile memory of a computing device;
   scanning the non-volatile memory of the computing device with the mobile device using a low-level read operations scan, wherein scanning is completed via a processor included in the mobile device;
   collecting data on the mobile device from the low-level read operations scan, wherein the data includes binary code;
   reading the binary code with a mobile device; and
   evaluating the data collected on the mobile device for malicious software located on the computing device based on the reading of the binary code with the mobile device.

2. The method of claim 1, wherein evaluating the data collected on the mobile device includes evaluating the data for at least one of a rootkit, virus, trojan horse, worm, spyware, adware, scareware, and crimeware.

3. The method of claim 1, wherein evaluating the data collected on the mobile device includes using a signature based detection method for detecting malicious software.

4. The method of claim 1, wherein evaluating the data collected on the mobile device includes using a heuristic based detection method for detecting malicious software.

5. The method of claim 1, wherein collecting data on the mobile device includes collecting data from an operating system-level scan performed by the mobile device for detecting malicious software on the computing device.

6. The method of claim 5, wherein evaluating the data collected on the mobile device includes comparing the data collected from the low-level read operations scan performed by the mobile device with the data collected from the operating system-level scan performed by the mobile device for detecting malicious software on the computing device.

7. The method of claim 6, wherein evaluating the data collected on the mobile device includes providing an indication of a presence of malicious software when a difference between the operating scan data and the low-level read operations scan data is detected.

8. The method of claim 1, wherein the method includes configuring the mobile device to charge while performing the low-level read operations.

9. A machine-readable non-transitory medium storing instructions for detecting malicious software on a computing device with a mobile device executable by the mobile device to cause the mobile device to:
   recognize a non-volatile memory of the computing device that is mounted by the mobile device;
   scan the non-volatile memory using a low-level read operations scan completed via a processor included in the mobile device;
   collect scanning data on the mobile device from the low-level read operations scan and an operating system-level scan; wherein the scanning data from the low-level read operations scan and an operating system-level scan, wherein the scanning data from the low-level read operations scan includes binary code;
   reading the binary code with the mobile device;
   evaluate the scanning data from the low-level read operations scan for malicious software based on the reading of the binary code with the mobile device;

evaluate and the operating system-level scan, wherein the data from the low-level read operations scan and the operating system-level scan are compared; and indicate the existence of malicious software located on the computing device when a number of differences between the low-level read operations scan and the operating system-level scan are detected and when malicious software is detected on the computing device when a number of differences between the low-level read operations scan and the operating system-level scan are detected and when malicious software is detected on the computing device based on the reading of the binary code with the mobile device.

10. The machine-readable non-transitory medium of claim 9, wherein the instructions include instructions executable by the computer to cause the computer to perform the operating system-level scan with the mobile device.

11. The machine-readable non-transitory medium of claim 9, wherein the instructions include instructions executable by the computer to cause the computer to perform the operating system-level scan with an on-line malicious software scanning service.

12. The machine-readable non-transitory medium of claim 9, wherein the instructions include instructions executable by the computer to cause the computer to perform the operating system-level scan with a program executed on the computing device for detecting malicious software.

13. The machine-readable non-transitory medium of claim 9, wherein the instructions include instructions executable by the computer to cause the computer to evaluate a number of binaries present on the non-volatile memory.

14. The machine-readable non-transitory medium of claim 9, wherein the instructions include instructions executable by the computer to cause the computer to evaluate a number of copies of the number of binaries within an operating memory.

15. The machine-readable non-transitory medium of claim 9, wherein the instructions include instructions executable by the computer to cause the computer to perform the low-level read operations scan at a lower level than a kernel level.

16. A mobile device for detecting malicious software on a computing device, comprising:
a memory; and
a processor configured to execute executable instructions stored in the memory to:
recognize a non-volatile memory of the computing device that is mounted by the mobile device;
scan the non-volatile memory using a low-level read operations scan and an operating system-level scan completed via the processor included in the mobile device;
collect scanning data on the mobile device from the low-level read operations scan and the operating system-level scan, wherein the scanning data from the low-level read operations scan includes binary code;
reading the binary code with the mobile device;
evaluate the scanning data from the low-level read operations scan for malicious software based on the reading of the binary code with the mobile device;
evaluate differences between the low-level read operations scan and the operating system-level scan; and
indicate an existence of malicious software located on the computing device when a number of differences between the low-level read operations scan and the operating system-level scan are detected and when malicious software is detected on the computing device based on the reading of the binary code with the mobile device.

17. The mobile device of claim 16, wherein the mobile device for detecting malicious software on the computing device includes a smart phone.

18. The mobile device of claim 16, wherein the instructions stored in the memory to scan the non-volatile memory using the low-level read operations scan includes instructions stored in the memory to perform the low-level read operations scan at a hardware level.

19. The mobile device of claim 16, wherein the instructions stored in the memory to scan the non-volatile memory using the low-level read operations scan includes instructions stored in the memory to read data directly from the non-volatile memory.

20. The mobile device of claim 16, wherein the mobile device mounts the non-volatile memory of the computing device through a USB cable.

\* \* \* \* \*